(12) United States Patent
Kohata

(10) Patent No.: US 11,893,293 B2
(45) Date of Patent: Feb. 6, 2024

(54) STORAGE MEDIUM AND CONTROL METHOD OF INFORMATION PROCESSING APPARATUS UTILIZING FIRST AND SECOND PRINT CONTROL SOFTWARE CREATING FIRST AND SECOND FORMAT PRINT DATA

(71) Applicant: CANON KABUSHIKI KAISHA, Tokyo (JP)

(72) Inventor: Toru Kohata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/153,478

(22) Filed: Jan. 12, 2023

(65) Prior Publication Data

US 2023/0148058 A1 May 11, 2023

Related U.S. Application Data

(63) Continuation of application No. 17/840,896, filed on Jun. 15, 2022, now Pat. No. 11,579,825, which is a (Continued)

(30) Foreign Application Priority Data

Apr. 27, 2020 (JP) .................. 2020-078324

(51) Int. Cl.
*G06F 3/12* (2006.01)
*G06K 15/00* (2006.01)

(52) U.S. Cl.
CPC .......... *G06F 3/1245* (2013.01); *G06F 3/1204* (2013.01); *G06F 3/1206* (2013.01); (Continued)

(58) Field of Classification Search
None
See application file for complete search history.

(56) References Cited

U.S. PATENT DOCUMENTS

| 10,445,039 B2 | 10/2019 | Kiyose |
| 2003/0231330 A1 | 12/2003 | Westervelt |

(Continued)

FOREIGN PATENT DOCUMENTS

JP 2019-53403 A 4/2019

*Primary Examiner* — Lennin R Rodriguezgonzalez
*Assistant Examiner* — Lennin R Rodriguez
(74) *Attorney, Agent, or Firm* — VENABLE LLP

(57) ABSTRACT

An object of the present disclosure is to provide a printing system capable of supporting a plurality of printable areas for one paper size. One embodiment of the present invention is a non-transitory computer readable storage medium storing a program for causing a computer to perform a control method in an information processing apparatus including: first printing control software; and second printing control software that converts first format print data output by the first printing control software into second format print data, and the control method includes: a first creation step of creating raster data based on the first format print data; a medium determination step of performing determination of whether a printing-target medium is a medium that needs a margin larger than a regular size; and a margin insertion step of performing margin insertion processing for raster data created at the first creation step.

25 Claims, 15 Drawing Sheets

Related U.S. Application Data continuation of application No. 17/232,914, filed on Apr. 16, 2021, now Pat. No. 11,392,336.

(52) U.S. Cl.
CPC .......... *G06F 3/1208* (2013.01); *G06F 3/1247* (2013.01); *G06F 3/1257* (2013.01); *G06K 15/4015* (2013.01); *G06K 15/4065* (2013.01); *G06F 3/1229* (2013.01); *G06F 3/1256* (2013.01)

(56) References Cited

U.S. PATENT DOCUMENTS

| | | |
|---|---|---|
| 2005/0270555 A1 | 12/2005 | Lee |
| 2011/0194132 A1 | 8/2011 | Anai |

| Paper type | Margin-large size necessary ? | Necessary margin amount |
|---|---|---|
| Plain paper | NO | - |
| Photo paper | NO | - |
| Fine art paper | YES | 20mm |
| Thick paper | YES | 30mm |

FIG.7

STORAGE MEDIUM AND CONTROL METHOD OF INFORMATION PROCESSING APPARATUS UTILIZING FIRST AND SECOND PRINT CONTROL SOFTWARE CREATING FIRST AND SECOND FORMAT PRINT DATA

This application is a continuation of U.S. application Ser. No. 17/840,896, filed Jun. 15, 2022 (pending), which is a continuation of U.S. application Ser. No. 17/232,914, filed Apr. 16, 2021, now U.S. Pat. No. 11,392,336, issued on Apr. 16, 2021.

BACKGROUND OF THE INVENTION

Field of the Invention

The present disclosure relates to a storage medium and a control method of an information processing apparatus.

Description of the Related Art

There is a technique for an operating system (in the following, called OS) to provide a standard printing function (in the following, called OS standard printing function) without requiring a printer driver (in the following, called inherent printer driver), which is software inherent to a printer provided by a printer vendor. The OS determines whether a printer is compatible with the OS standard printing function (in other words, whether the printer supports the OS standard printing function) based on information acquired from the printer. In a case where the determination results indicate that the printer is compatible with the OS standard printing function, print data that is created by making use of the OS standard printing function is transmitted to the printer.

However, there is a case where a printer is not compatible with the OS standard printing function, and therefore, it is not possible for the printer to interpret print data created by the OS standard printing function. Further, even though the printer is compatible with the OS standard printing function, there is a case where it is desired to cause the printer to perform printing based on the printing settings more detail than those of the OS standard printing function. As a method for dealing with the cases such as these, a print data conversion utility is known for making it possible to use the OS standard printing function by making the printer seem to be compatible with the OS standard printing function in a pseudo manner without installing the inherent printer driver.

Incidentally, in information a printer handles, there exists size information indicating a maximum area in which it is possible to perform printing on paper, which is called a printable area. For example, in a case where a margin of 3 mm is necessary as the top, bottom, left, and right margins on paper of the A4 size (210 mm×297 mm) because of the mechanism of a printer, the printable area of the A4 size of this printer is 204 mm×291 mm. There is a case where the printable area is different depending on the paper type and the feeding port, and in the case such as this, it is necessary to set a plurality of printable areas for one paper size. Japanese Patent-Laid Open No. 2019-053403 has disclosed a technique to solve a problem in a case where there is a plurality of print paths between an information processing apparatus and a printer and the printable area is different for each print path.

SUMMARY OF THE INVENTION

There is a case where it is not possible for the OS standard printing function to support a plurality of printable areas for one paper size and in the case such as that, even in the printing by the print data conversion utility, it is not possible to support a plurality of printable areas for one paper size. On the other hand, generally, it is possible for the inherent printer driver to support a plurality of printable areas for one paper size.

As described above, there is such a problem that it is not possible for the OS standard printing function to support the function supported by the inherent printer driver and even the print data conversion utility cannot support the function. Consequently, in view of the above-described problem, an object of one embodiment of the present invention is to provide a printing system capable of supporting a plurality of printable areas for one paper size without using the inherent printer driver.

One embodiment of the present invention is a non-transitory computer readable storage medium storing a program for causing a computer to perform a control method in an information processing apparatus including: first printing control software that supports a standard printing function independent of a printing apparatus; and second printing control software that converts first format print data output by the first printing control software into second format print data inherent to a connected printing apparatus, and the control method includes: a first creation step of creating raster data based on the first format print data; a medium determination step of performing determination of whether a printing-target medium is a medium that needs a margin larger than a regular size; a margin insertion step of performing margin insertion processing for raster data created at the first creation step in a case where determination results at the medium determination step are affirmative; and a second creation step of creating the second format print data based on raster data into which a margin has been inserted at the margin insertion step.

Further features of the present invention will become apparent from the following description of exemplary embodiments with reference to the attached drawings.

BRIEF DESCRIPTION OF THE DRAWINGS

FIG. 7 is a diagram showing a data table stored in a device model information database;

DESCRIPTION OF THE EMBODIMENTS

In the following, with reference to the attached drawings, embodiments of the present invention are explained in detail. The following embodiments are not intended to limit the present invention relating to the claims and all combinations of features explained in the following are not necessarily indispensable to the solution of the present invention.

First Embodiment

<Configuration of Printing System>

Figure 1:
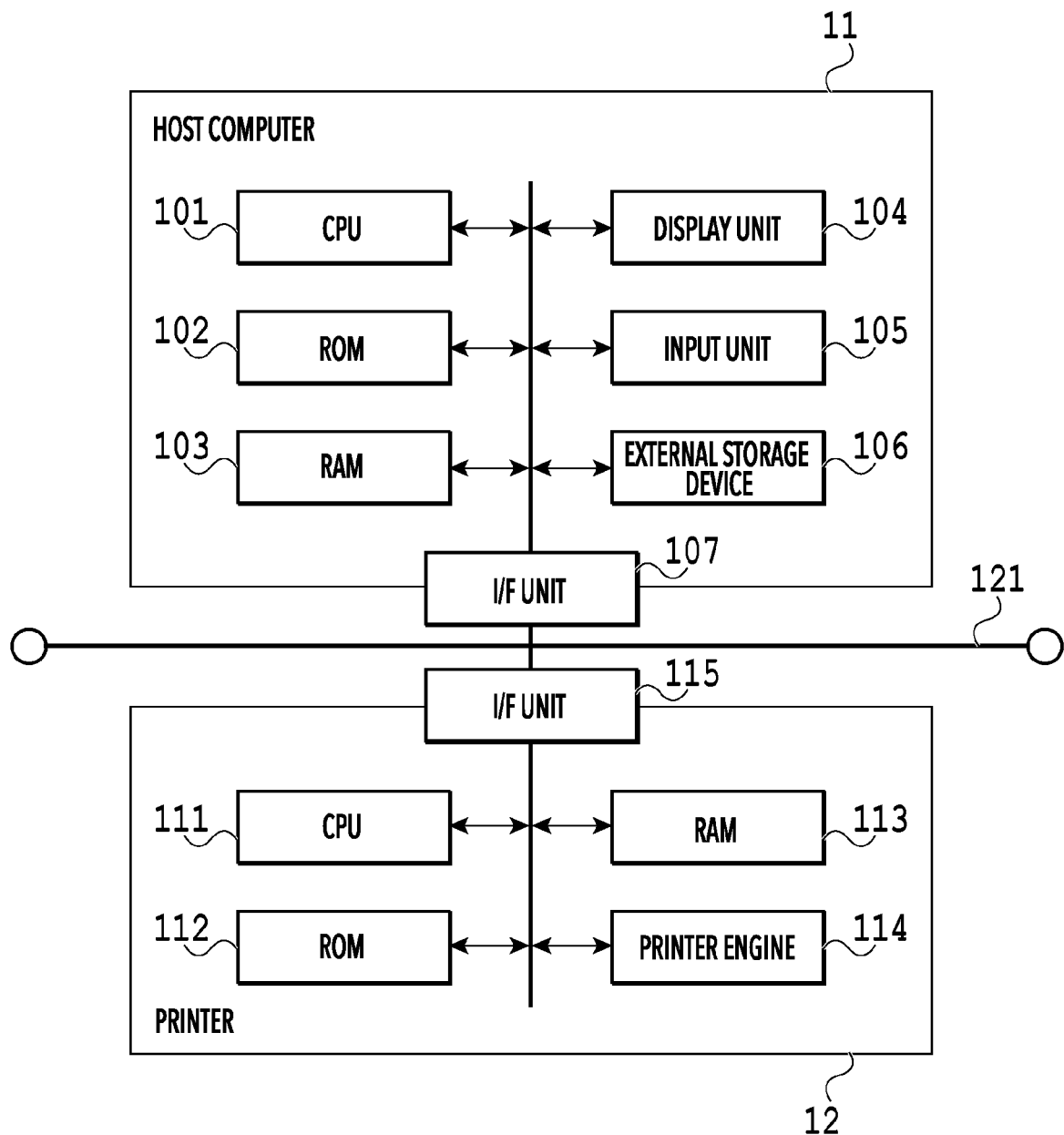
FIG. 1 is a block diagram showing a hardware configuration of a printing system.

In the following, the hardware configuration of a printing system in the present embodiment is explained by using FIG. 1. FIG. 1 shows a system as an example of a printing system to which the present embodiment can be applied, in which a host computer 11 and a printer 12 are connected so as to be capable of communication via a communication bus 121, such as Ethernet (registered trademark) and USB. In the example in FIG. 1, the printing system has one printer, but the printing system may have a plurality of printers and it is possible to connect an arbitrary number of printers to the host computer via the communication bus 121.

The host computer 11 is an example of an information processing apparatus. In the host computer 11, an operating system (in the following, called OS) is installed. The OS comprises an OS standard printing system 202, which is OS standard printing software, to be described later.

The host computer 11 is, for example, a personal computer (PC) and has a CPU 101, a ROM 102, a RAM 103, a display unit 104, an input unit 105, an external storage device 106, and an interface (in the following, abbreviated to I/F) unit 107. The host computer 11 to which the present embodiment can be applied is not limited to a desktop PC and may be a note PC, a tablet PC, and a smartphone.

The host computer 11 transmits instructions to control the printer 12, print data, setting commands and the like to the printer 12. The CPU 101 is a central processing unit configured to control each unit of the host computer 11 and executes various control programs, such as the OS and a print data conversion utility 203, to be described later. In the ROM 102, the OS and the like are stored. The RAM 103 is used as a work area of the CPU 101. In the external storage device 106, an application program and various control programs, such as the print data conversion utility 203, are stored.

The input unit 105 is an input device including a keyboard, a mouse and the like for operating the host computer 11. The display unit 104 is a display device that produces a display to check information that is input by a user via the input unit 105, a display of a graphical user interface screen of the OS or the application, a display of a message, and the like. The I/F unit 107 is a communication module that performs transmission and reception of data with the printer 12.

The printer 12, which is a printing apparatus, is, for example, an ink jet printer. The printer 12 has a CPU 111, a ROM 112, a RAM 113, a print engine 114, and an I/F unit 115. The CPU 111 is a central processing unit configured to control each unit of the printer 12. The ROM 112 is a read-only memory. In the ROM 112, programs that control the print engine 114 are stored. In the RAM 113, programs necessary for the operation of the print engine 114, setting value data received from the host computer 11, and the like are stored temporarily.

The print engine 114 forms an image on a medium (for example, recording paper and also called media) by performing printing based on the print data sent from the host computer 11. The I/F unit 115 performs transmission and reception of data with the host computer 11 and receives a print job from the host computer 11, transmits status information on the printer 12 to the host computer 11, and so on. The status information referred to here is information indicating the current state of the printer 12, which the printer 12 can transmit as a response to a request from the host computer 11 connected via the I/F unit 115. The status information is information for notifying an external apparatus, such as the host computer 11, of the operating state of the printer 12, for example, such as "during printing" and "standby state", and the error state of the printer 12, such as "out of paper", "cover is open", and "no remaining ink".

<Software Configuration>

Figure 2:
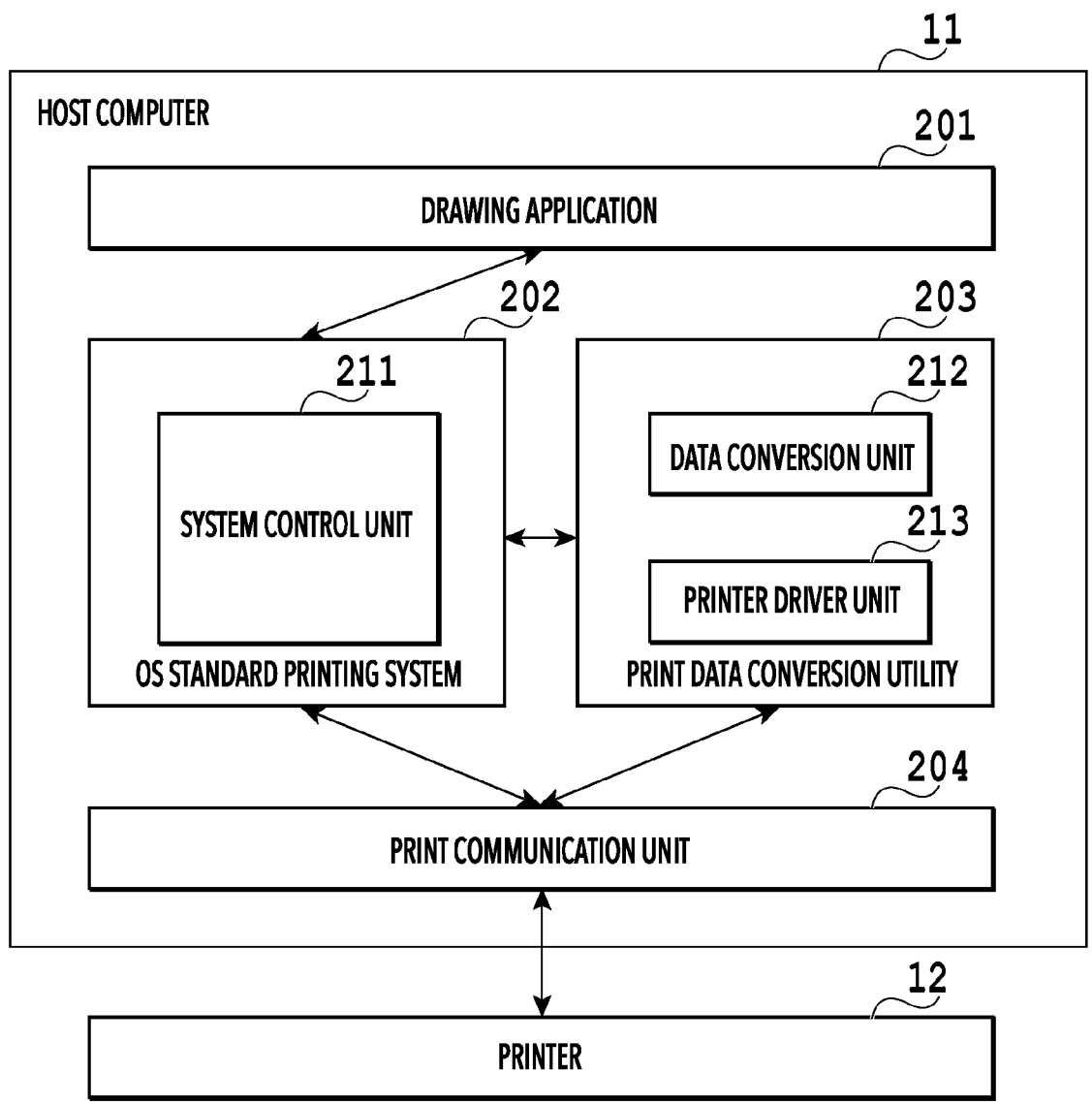
FIG. 2 is a block diagram showing a software configuration of a host computer.

FIG. 2 is a block diagram showing the software configuration of the host computer 11 in the present embodiment. On the host computer 11, the OS standard printing system 202, which is OS standard printing software, and the print data conversion utility 203, which is printing control software, are mounted operably. Further, on the host computer 11, a drawing application 201 is mounted.

The drawing application 201 is software that creates drawing data based on user instructions. The application referred to here is software that runs on the OS, which is the basic software of the host computer 11. The drawing application 201 has the function to perform printing based on the created drawing data and as the drawing application 201, mention is made of, for example, document creation word processor software, image editing software, new year's card creation software and the like. The drawing data that is created by the drawing application 201 is, for example, data in the PDF (Portable Document Format) format.

After creating drawing data, the drawing application 201 makes a printing request to the OS standard printing system 202 based on user instructions. In a case where a printing request is made, as regards the printing setting, it may also be possible to receive instructions relating to the printing setting from a user via a graphical user interface screen (in the following, called GUI screen) for setting, which is provided by the print data conversion utility 203. In a case where a printing request is made from the OS standard printing system 202, a print job including the information relating to the printing setting created by the print data conversion utility 203 and the drawing data created by the drawing application 201 is delivered to the OS standard printing system 202. In the information relating to the printing setting, information on the paper size, the paper type, which print queue printing is performed in and the like is included.

The OS standard printing system 202 is OS standard printing software comprising standard functions necessary for print data creation and performs spool processing of the drawing data created by the drawing application 201 and creates print data in a predetermined format (also called standard format print data). Further, the OS standard printing system 202 performs processing to output the created print data in the standard format to the print data conversion utility 203. Alternatively, the OS standard printing system 202 performs processing to output the print data in the standard format directly to a print communication unit 204 in order to transmit the data directly to the printer 12 without outputting the data to the print data conversion utility 203. Further, the OS standard printing system 202 acquires identification information, such as device model information on the printer 12, via the print communication unit 204 in order to determine whether the printer 12 supports the OS standard printing system 202. The information that is acquired for the support determination is not limited to the device model information on the printer 12 and may be capability information on the printer 12 and the like. The various kinds of processing in the OS standard printing system 202 are performed by the control of a system control unit 211 within the OS standard printing system 202.

The print data conversion utility 203 is software that converts print data in the standard format, which is output from the OS standard printing system 202, into print data in the format inherent to a printer vendor (also called inherent format print data).

Here, explanation is given on the assumption that the printer 12 does not support the OS standard printing system 202. It is not possible for the printer 12 that does not support the OS standard printing system 202 to interpret the print data in the standard format created by the OS standard printing system 202 even though it receives the print data. Because of this, in the present embodiment, the host computer 11 mounts the print data conversion utility 203. The print data conversion utility 203 converts the print data in the standard format into print data in the format inherent to a printer vendor (in the following, also called "individual format") that the printer 12 can interpret. Due to this, it is made possible to cause the printer 12 that does not support the OS standard printing system 202 to perform printing using the standard function of the OS standard printing system 202.

Even though the printer supports the OS standard printing system (that is, even though the printer can interpret print data in the standard format), it may be possible to use the print data conversion utility 203. By using the print data conversion utility 203, it is made possible for the printing system to provide more functions. For example, the standard function provided by the OS standard printing system 202 does not include the stamp function or the setting function of print quality. The reason is that the OS standard printing system 202 does not support the function that only the limited printer has because the OS standard printing system 202 needs to support as many printers as possible. Because of this, by using the print data conversion utility 203, it is made possible for the printing system to provide the functions equivalent to those of the printer driver inherent to the printer vendor (inherent printer driver).

The print data conversion utility 203 has a data conversion unit 212 and a printer driver unit 213 and receives print data in the standard format and printing setting information from the OS standard printing system 202 and performs processing necessary for printing control. Specifically, the print data conversion utility 203 first acquires device model information from the printer 12 via the print communication unit 204 and determines whether the printer 12 supports the OS standard printing system 202. The information that is acquired for support determination is not limited to the device model information on the printer 12 and may be capability information on the printer 12, and the like.

In a case of determining that the printer 12 does not support the OS standard printing system 202, the print data conversion utility 203 performs virtual printer creation processing for virtually handling the printer 12 as a printer supporting the OS standard printing system 202 in a pseudo manner. As described previously, even though the printer supports the OS standard printing system 202, in a case where the functions equivalent to those of the printer driver inherent to the printer vendor should be provided, it is desirable to perform this virtual printer creation processing. Further, the print data conversion utility 203 performs processing to convert the print data in the standard format and the printing setting information, which are received from the OS standard printing system 202, into print data in the individual format by using the data conversion unit 212 and the printer driver unit 213. By converting data using the printer driver unit 213, even in a case where the number of functions provided by the OS standard printing system 202 is small, it is possible to provide the functions equivalent to those of the printer driver inherent to the printer vendor. The OS standard printing system 202 in the present embodiment performs transmission and reception of data with the print data conversion utility 203 by using IPP (Internet Printing Protocol), which is the standard printing protocol.

The print communication unit 204 is a communication module that transmits the print data in the standard format, which is output by the OS standard printing system 202, or the print data in the individual format, which is output by the print data conversion utility 203, to the printer 12. Further, the print communication unit 204 also performs reception of data (data acquisition), such as status information transmitted from the printer 12.

<Outline of Print Data Conversion Utility>

Figure 3:
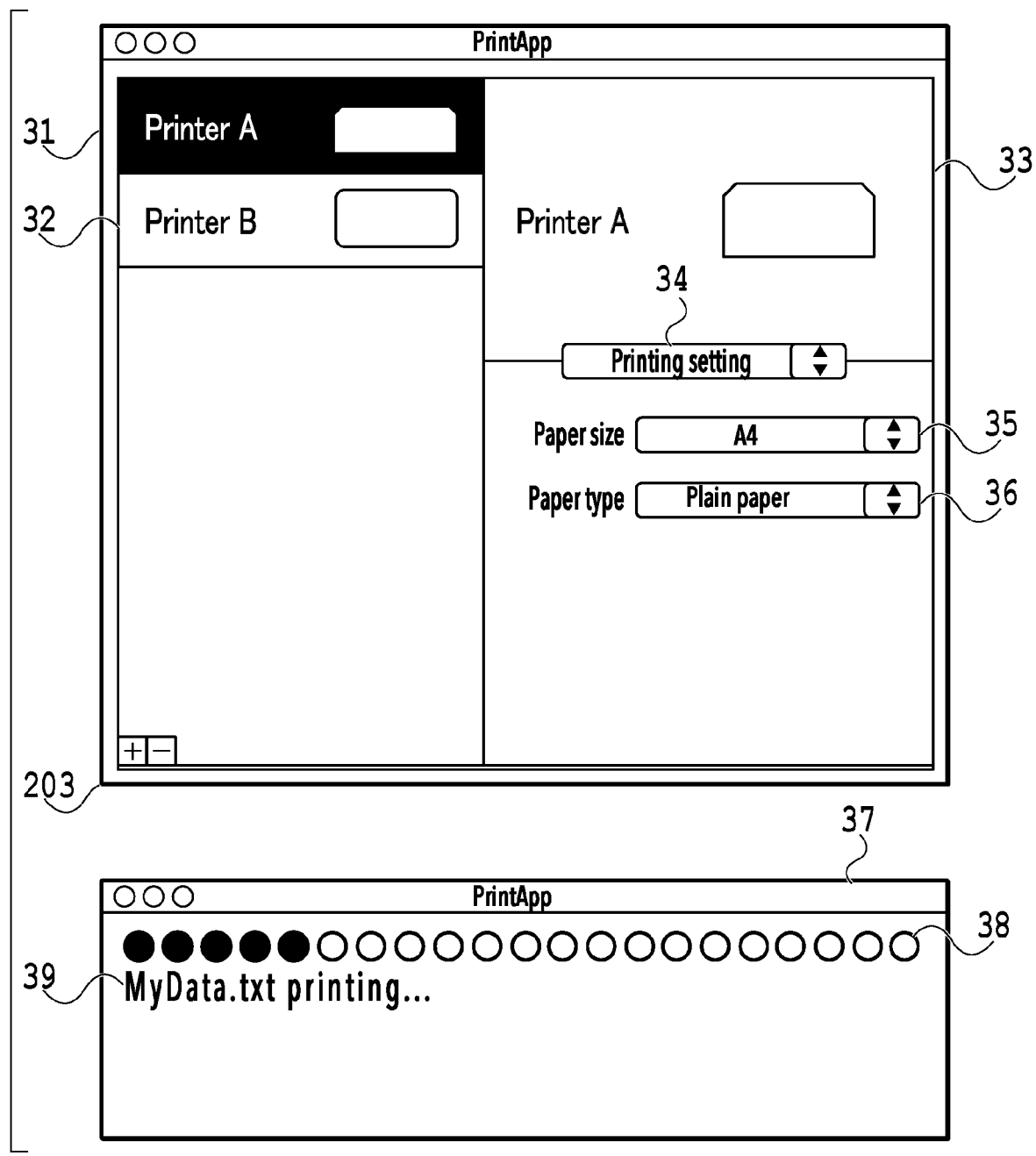
FIG. 3 is a schematic diagram of a GUI screen provided by a print data conversion utility.

In the following, the outline of the print data conversion utility 203 in the present embodiment is explained. FIG. 3 shows a GUI screen provided by the print data conversion utility 203. Inside a main window 31, there exists a registered printer list display portion 32 in which a list of printers already registered in the print data conversion utility 203 is displayed. Further, there exists a selected printer information display portion 33 that displays information on a selected printer in a case where a printer is selected from the registered printer list display portion 32. Furthermore, a printer printing setting menu 34, which is a printing setting menu of a selected printer, and a paper size menu 35 and a paper type menu 36 as detailed printing setting menus are displayed. A user selects a paper size and a paper type, which are actually set to the printer 12, in the paper size menu 35 and the paper type menu 36. In a printer having a plurality of feeding ports, the number of settings of the paper size menu 35 and the paper type menu 36 is the same as the number of feeding ports. Further, on the GUI screen provided by the print data conversion utility 203, a print job management window 37 is also included, which is for managing a print job, displaying a job status, and so on, in a case where a print job is input to the print data conversion utility 203. In the print job management window 37, a print job progress situation check portion 38 indicating the progress situation of a print job and a job status display portion 39 indicating the state of a print job exist.

<Printing Setting in Drawing Application>

Figure 4:
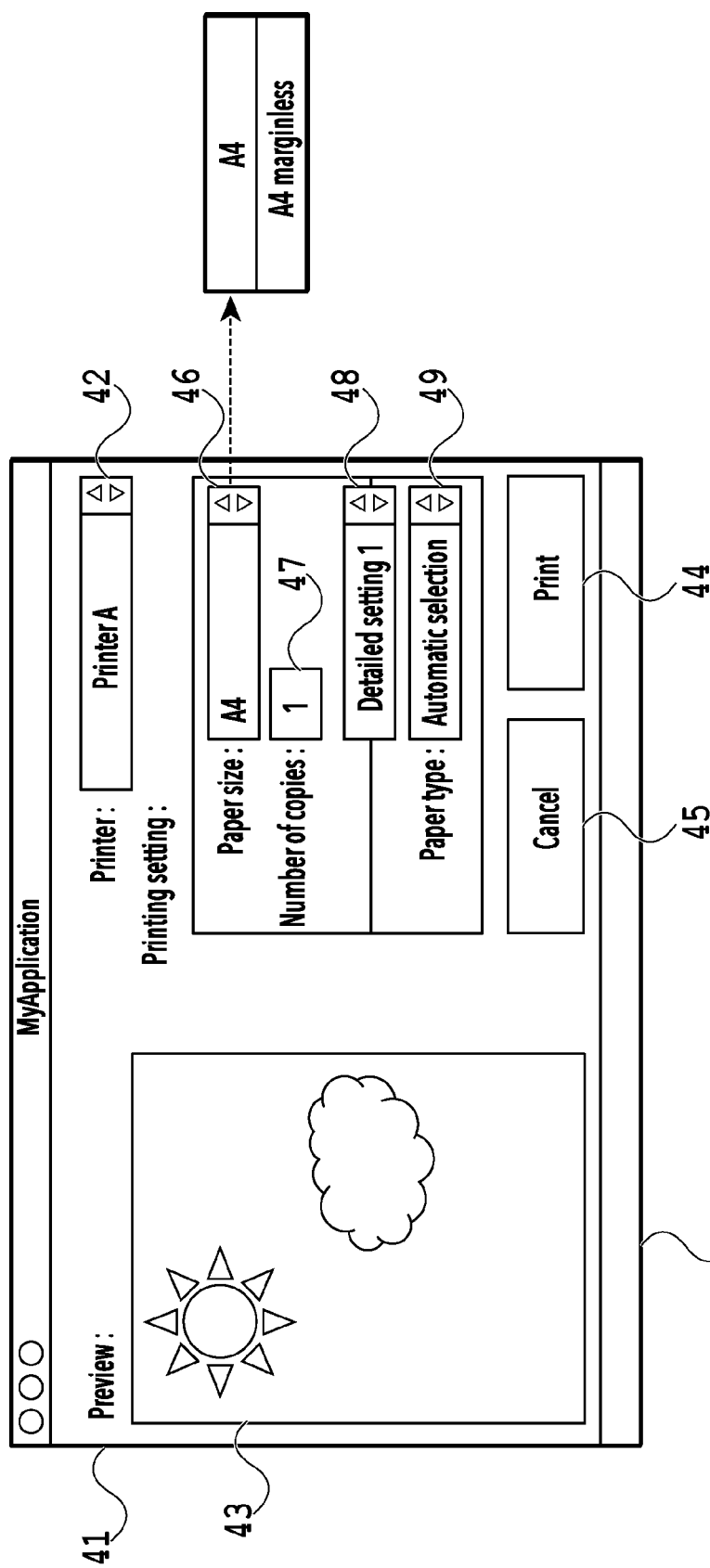
FIG. 4 is a schematic diagram of a printing setting dialog in a drawing application.

FIG. 4 shows an example of a printing dialog 41 provided by the drawing application 201. The printing dialog 41 a screen that is displayed by a user giving instructions to perform printing on the screen of the drawing application after creating drawing data using the drawing application 201. The printing dialog 41 has a printer menu 42 for selecting a printer that is caused to perform printing, a printing preview area 43, a Print button 44 to give instructions to perform printing, and a Cancel button 45 to close the printing dialog 41 and return the control to that by the drawing application. The printing dialog 41 further has a paper size menu 46 for giving instructions to perform printing setting, a number of copies setting item 47, and a detailed setting menu 48 for performing other detailed settings. In the detailed setting menu, for example, a menu such as a paper type menu 49 exists. Among these menus, the paper size menu 46, the number of copies setting item 47, and the paper type menu 49 are provided by the OS standard printing system 202, not the drawing application 201.

In the printer menu 42, it is possible to select the virtual printer described previously, which is created by the print data conversion utility 203, in addition to the printer that supports the OS standard printing system 202. At this time, in a case where the virtual printer is selected in the printer menu 42, the various printing settings supported by the virtual printer are displayed. The printing settings are displayed by the print data conversion utility 203 notifying the OS standard printing system 202 of printing setting information. In the paper size menu 46, each of the regular sizes whose outer shape is the same but whose printable area is different is displayed individually. For example, in a case of the size whose outer shape size is A4, in addition to the normal A4 size, the A4 marginless size whose margin amount is 0 and whose printable area is equal to the outer shape size is displayed. In the printing in the OS standard printing system 202, there is a case where it is possible to support only the two printable areas at the maximum for one outer shape size. In this case, it is not possible to support a third size that can be supported in the printing by the inherent printer driver, that is, the size whose margin is larger than that of the normal regular size (in the following, called "margin-large size"), and therefore, this is not displayed in the paper size menu 46.

<Data Conversion Processing by Print Data Conversion Utility>

Figure 5:
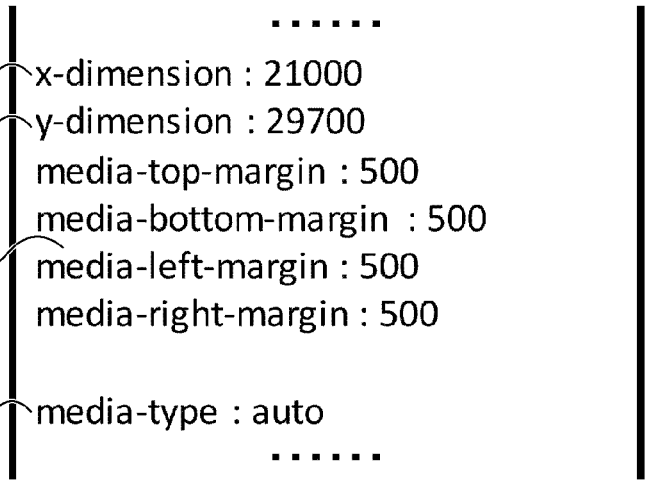
FIG. 5 is a diagram showing printing setting information.

In the following, processing in a case where printing instructions are given via the printing dialog 41 that is provided by the drawing application 201 is explained. The drawing application 201 delivers print data in the standard format and printing setting information based on the printing settings on the printing dialog 41, which includes the paper size menu 46 and the like, to the print data conversion utility 203 via the OS standard printing system 202. FIG. 5 shows an example of printing setting information. The printing setting information shown in FIG. 5 is represented by using IPP as one implementation example by the OS standard protocol. FIG. 5 shows an example of a case where the A4 regular size is selected in the paper size menu 46 and "Automatic selection" is selected in the paper type menu 49. As the printing setting information, paper width information 51, paper height information 52, paper margin information 53, and paper type information 54 are set. First, the print data conversion utility 203 compares the setting contents in the paper size menu 35 and in the paper type menu 36 in the main window 31 and the setting contents of the paper width information 51, the paper height information 52, the paper margin information 53, and the paper type information 54. At the time of the comparison, the information on the outer shape and the like corresponding to the size that is set in the paper size menu 35 is stored in the device model information database stored by the printer driver unit 213, and therefore, the information is acquired from the device model information database. In a case where the comparison results indicate that both printing settings match with each other, the print data conversion utility 203 performs print data creation processing based on both printing settings. Specifically, the print data conversion utility 203 performs processing to convert print data in the standard format into print data in the individual format by using the data conversion unit 212 and the printer driver unit 213. On the other hand, in a case where the comparison results indicate that both printing settings do not match with each other, the print data conversion utility 203 displays an error to the effect that both printing settings do not match with each other on the print job management window 37 and suspends printing. In a case where the setting information (setting value) of the paper type information 54 is "auto", the print data conversion utility 203 does not perform the comparison processing between the setting information of the paper type information 54 and the setting information in the paper type menu 36 and operates based on the setting in the paper type menu 36. At this time, in the paper type menu 36, there is a case where a paper type is selected, for which desired printing results are not obtained unless the margin-large size is selected. In this case, it is possible to obtain desired printing results by performing processing to insert a desired margin at the time of the conversion processing into print data in the individual format using the data conversion unit 212 and the printer driver unit 213.

Figure 6:
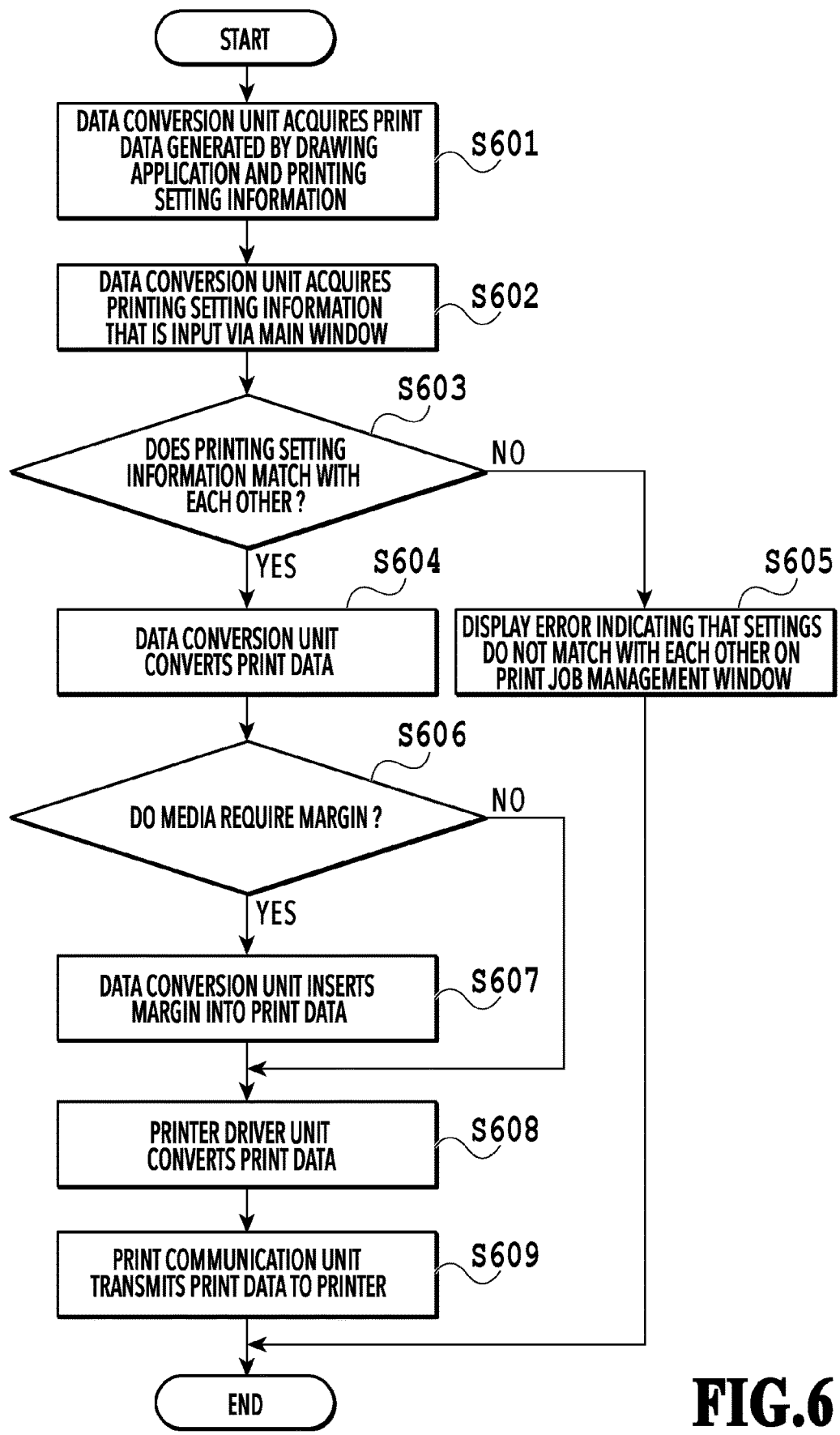
FIG. 6 is a flowchart showing a flow of each piece of processing performed by a print data conversion utility in a first embodiment.

FIG. 6 is a flowchart showing a flow of each piece of processing that is performed by the print data conversion utility 203. The following flow is started in a case where a user gives printing instructions on the drawing application 201.

At step S601, the data conversion unit 212 acquires the print data in the standard format, which is created by the drawing application 201, and the printing setting information. In the following, "step S-" is abbreviated to "S-".

At S602, the data conversion unit 212 acquires the printing setting information that is set via the main window 31, specifically, the printing setting information in the paper size menu 35, the paper type menu 36 and the like.

At S603, the data conversion unit 212 determines whether the contents of the printing setting information acquired at S601 and the contents of the printing setting information acquired at S602 match with each other. In a case where the determination results at this identity determination step are affirmative, the processing advances to S604 and on the other hand, in a case where the determination results are negative, the processing advances to S605.

First, a case where the determination results at S603 are negative (in a case of NO at S603) is explained. In this case, at S605, the print data conversion utility 203 displays a message to the effect that the contents of the printing setting information acquired at S601 and the contents of the printing setting information acquired at S602 do not match with each other on the print job management window 37. After this step, the series of processing by the print data conversion utility 203 is completed.

Following the above, a case where the determination results at S603 are affirmative (in a case of YES at S603) is explained. In this case, at S604, the data conversion unit 212 performs print data conversion processing. This conversion processing is processing to create raster data that the printer driver unit 213 can read based on the print data in the standard format and the printing setting information, which are acquired at S601.

At S606, the data conversion unit 212 determines whether the printing-target medium is a medium that requires the data of the margin-large size larger than the margin of the normal regular size at the time of printing based on the setting contents of the paper type of the printing setting information acquired at S601 and S602. This medium determination processing is performed by acquiring information indicating whether or not the data of the margin-large size of each paper type is necessary, which is stored in the device model information database stored by the printer driver 213. Here, FIG. 7 shows an example of a data table stored in the device model information database. As shown in FIG. 7, information indicating whether or not the data of the margin-large size is necessary and the necessary margin amount are managed for each paper type, and therefore, it is possible to perform determination in accordance with the setting of the paper type. In a case where the determination results at this step are affirmative, the processing advances to S607 and on the other hand, in a case where the determination results are negative, the processing advances to S608.

At S607, the data conversion unit 212 performs processing to insert the margin that is necessary into the print data. It is possible to acquire the margin amount that is inserted at S607 by referring to the data table shown in FIG. 7. In a case of NO at S606, that is, it is possible to perform printing without any problem with the margin of the normal regular size, the processing at S607 is skipped.

At S608, the printer driver unit 213 performs print data conversion processing to create print data in the individual format based on the raster data and the printing setting information and completes the data conversion.

Lastly, at S609, the print communication unit 204 transmits the print data acquired as a result of S608 to the printer 12 and the series of processing is completed.

<Margin Designation Processing>

Figure 8:
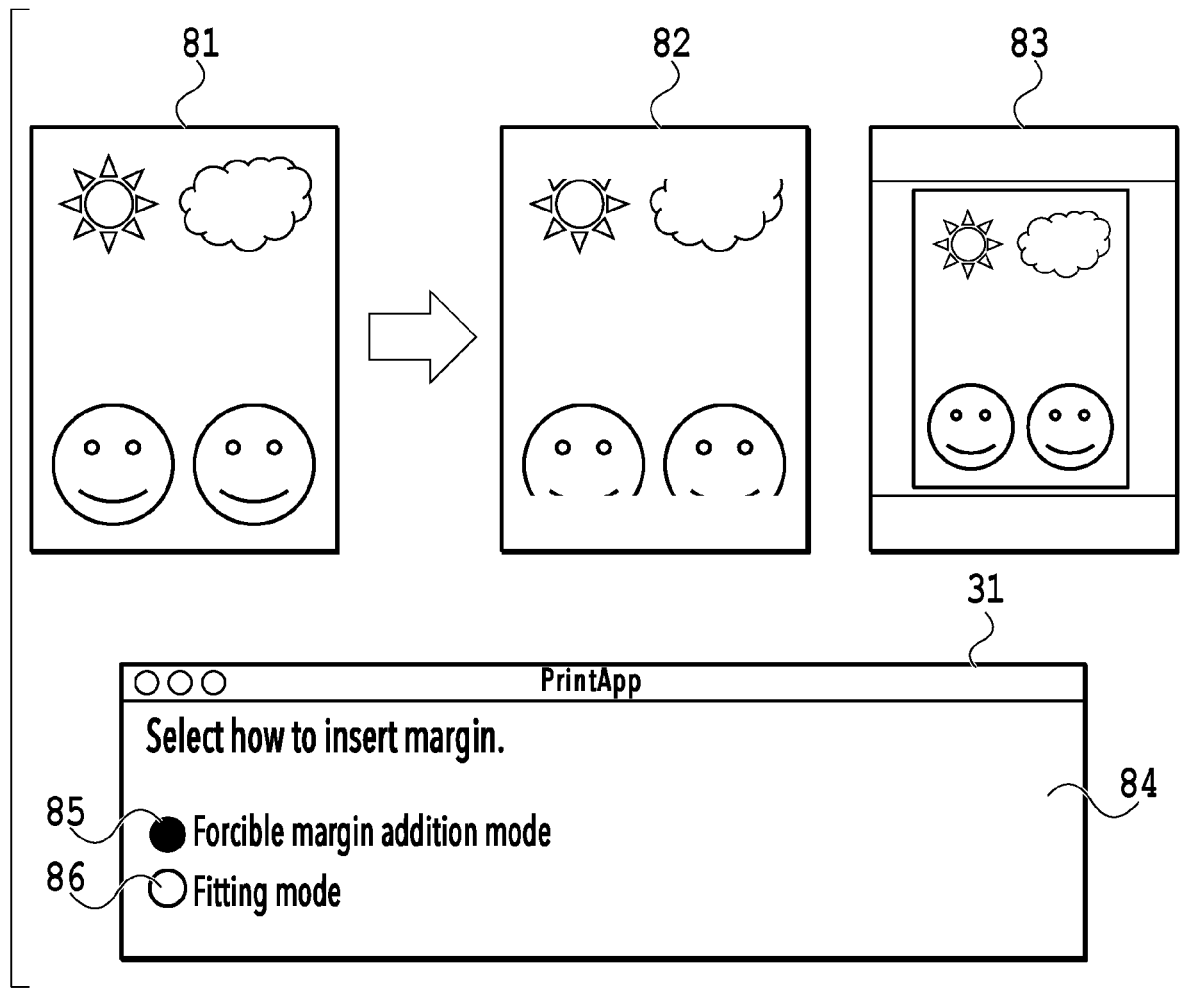
FIG. 8 is a schematic diagram showing data creation in the print data conversion utility.

It may also be possible to cause a user to select how to insert a margin at the time of the data conversion unit inserting a margin into the print data at S607, which is created at S604. As in FIG. 8, as a margin insertion method, there exist a method 82 of deleting the data in the margin area and a method 83 of securing the margin area and fitting the image data to within the print area for original data 81. Which of these two methods brings about desired printing results may be different depending on a user, and therefore, by causing in advance a user to select the method, desired results become more likely to be obtained. In that case, it is considered to present a GUI screen, for example, such as a margin designation screen 84, to a user. It is possible for a user to select one of a forcible margin addition mode 85 and a fitting mode 86 via the margin designation screen 84, which is a GUI screen provided by the print data conversion utility 203. In a case where a user selects the forcible margin addition mode 85, the printing results are as those by the method 82 of deleting the data in the margin area and in a case where a user selects the fitting mode 86, the printing results are as those by the method 83 of securing the margin area and fitting the data to within the print area. The module that inserts a margin into print data may be the printer driver unit 213 in place of the data conversion unit 212.

<Guidance of Printing Results to User>

Before the data conversion unit inserts a margin at S607 into the print data created at S604, it may also be possible for the printer 12 to perform display control to display a preview of the printing results in a case where a margin is inserted on the print job management window 37. Further, it may also be possible for the printer 12 to notify a user in advance that part of the image of the original data will be lost in a case where printing is performed with a margin being inserted on the print job management window 37. There is a possibility that the unintended lost of part of the image or the change in the layout in the printing results is not a user's desire. By presenting in advance information on the printing results to a user, it is possible for the user to check whether desired results are obtained before printing.

Figure 9B:
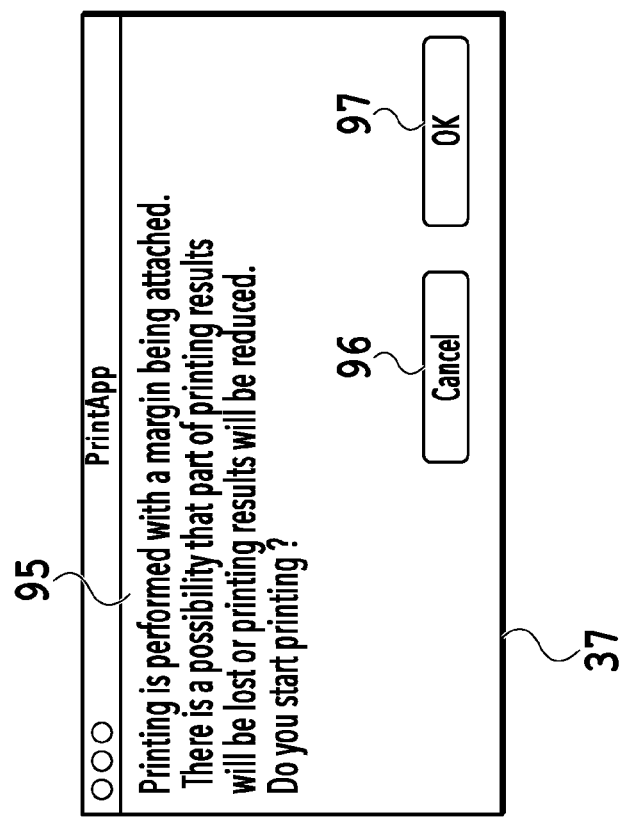
FIG. 9A is a printing results preview in the print data conversion utility and FIG. 9B is a schematic diagram showing a warning message at the time of performing printing.
Figure 9A:
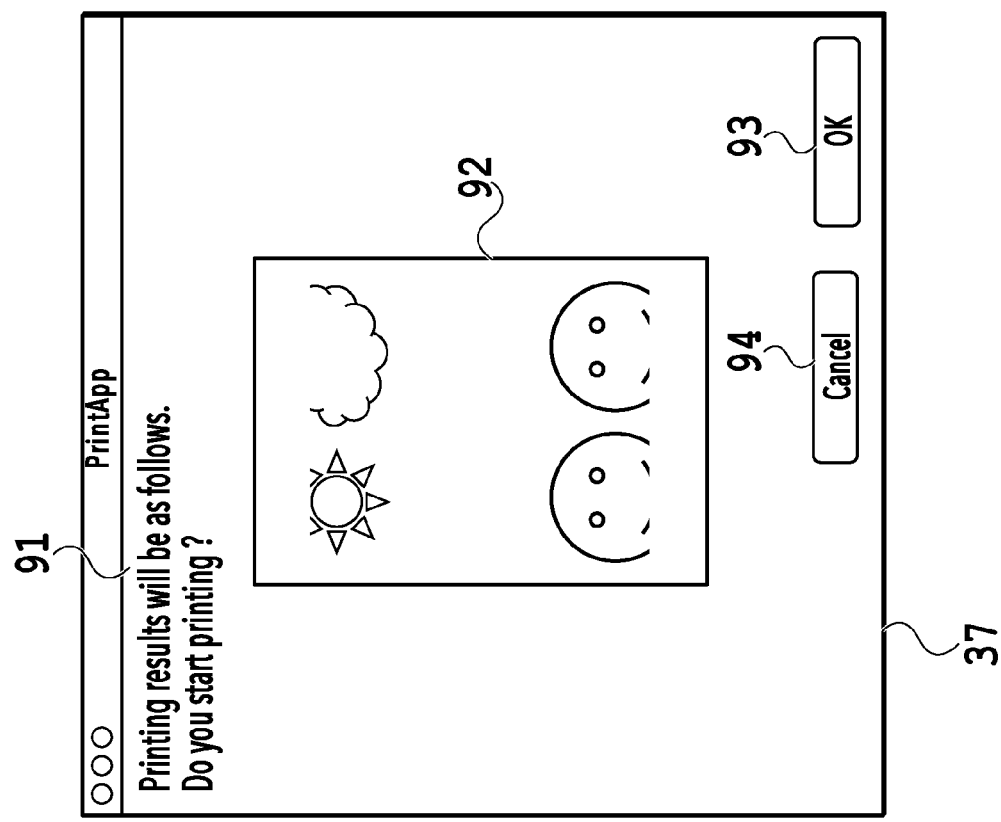

FIG. 9A shows an example of a printing results preview and FIG. 9B shows an example of a warning message indicating that part of printing results will be lost. A printing results preview screen 91 is a screen displaying a printing results preview image 92 in a case where a margin is inserted into print data on the print job management window 37. A user views the printing results preview screen 91 and determines whether to perform printing in this state and in a case where a user presses down an OK button 93, the printing processing is started. On the other hand, in a case where the printing results are not desired results and a user desires to cancel printing, it is possible for the user to suspend printing by pressing down a Cancel button 94.

A printing results check message screen 95 shown in FIG. 9B is a GUI screen presenting a message to the effect that there is a possibility of the lost of part of printing results or the reduction in the printing results in a case where a margin is inserted into the print data on the print job management window 37. As on the printing results preview screen 91 described previously, a user views the printing results check message screen 95 and determines whether to perform printing in this state and in a case where a user presses down an OK button 97, the printing processing is started. On the other hand, in a case where the printing results are not desired results and a user desires to cancel printing, it is possible for the user to suspend printing by pressing down a Cancel button 96.

<Skip of Margin Insertion Processing in Accordance with Actual Margin Amount of Print Data>

Further, an aspect is considered in which the actual margin amount itself in the print data in the standard format, which is created by the drawing application 201, is derived at the time of the data conversion unit inserting a margin into the print data at S607, and whether the derived margin amount is larger than or equal to a predetermined threshold value is determined. In a case where the derived margin amount is sufficient, that is, the derived margin amount is larger than or equal to the predetermined threshold value, it may be possible to skip the margin insertion processing at S607. The reason is that there is a user who creates data that secures in advance a margin on the drawing application 201, and in the case such as this, the margin insertion step is no longer necessary.

Second Embodiment

In the first embodiment, the margin insertion processing for print data is performed by the print data conversion utility. In contrast to this, in the present embodiment, instead of the print data conversion utility performing the margin insertion processing, margin information is attached to print data as printing setting information so that it is possible to insert a necessary margin in the processing at the time of printing by the printer 12. In the following, explanation of the contents common to those of the first embodiment is omitted appropriately and different points are explained mainly.

Figure 10:
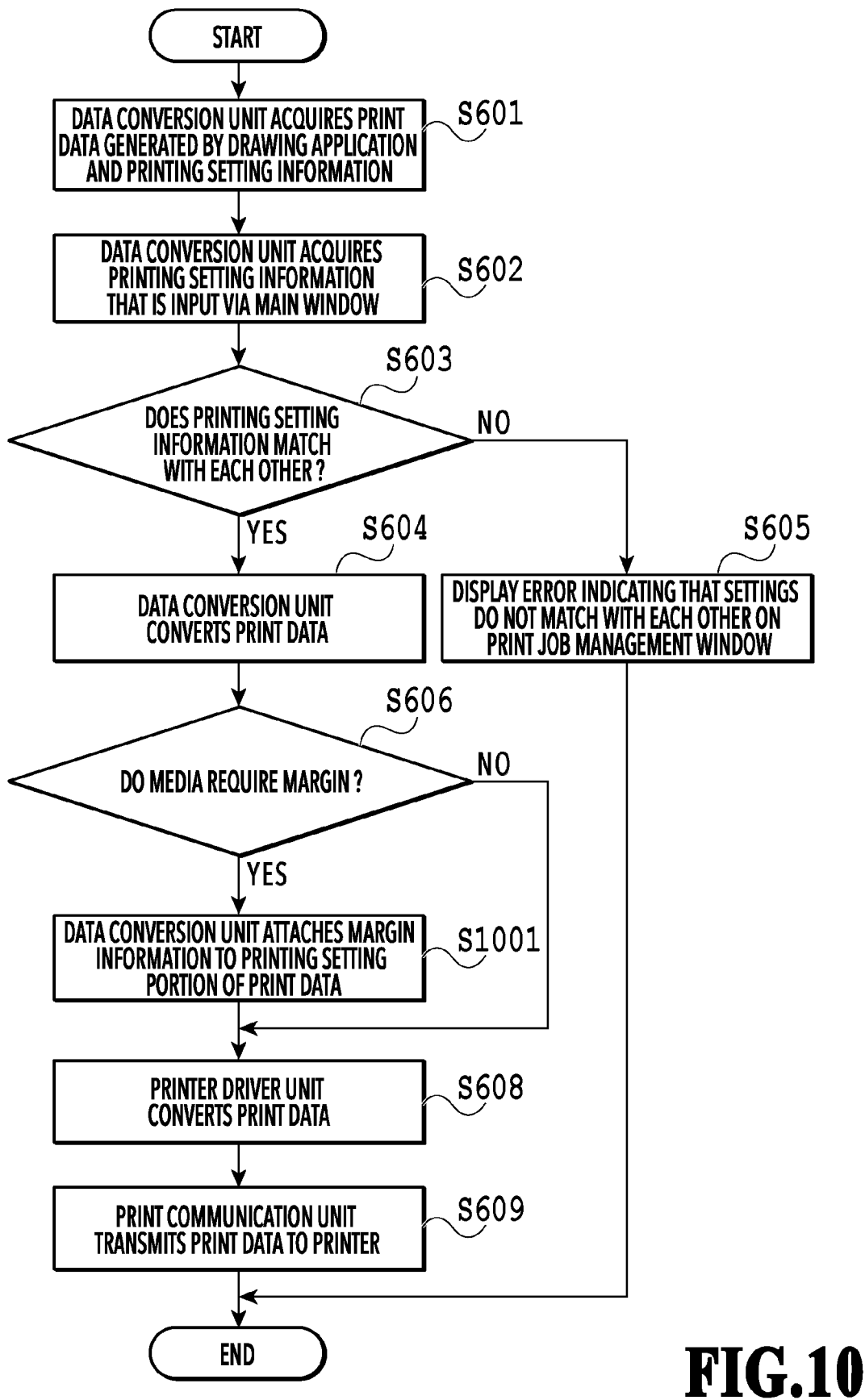
FIG. 10 is a flowchart showing a flow of each piece of processing performed by a print data conversion utility in a second embodiment.

FIG. 10 shows a flowchart showing processing of the print data conversion utility 203 in the present embodiment. The flow at S601 to S606 in FIG. 10 is the same as that of the first embodiment, and therefore, explanation of each piece of the processing is omitted (see FIG. 6).

In a case where the determination results at S606 are affirmative, that is, in a case where the data of the margin-large size is necessary, at S1001, the data conversion unit 212 attaches margin information as printing setting information in print data.

Figure 11:
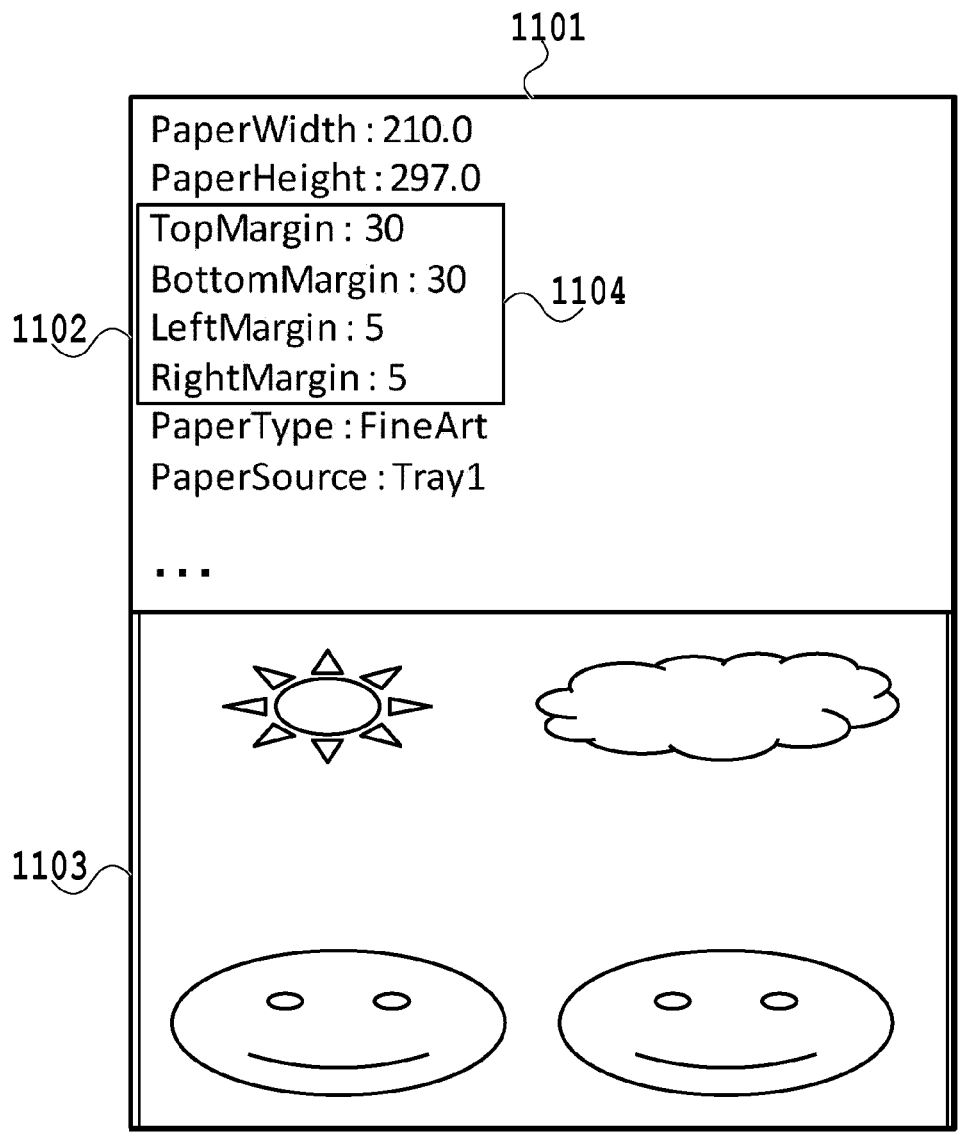
FIG. 11 is a diagram showing print data created by the print data conversion utility.

FIG. 11 shows an example of print data in the present embodiment. It is assumed that print data 1101 in the present embodiment includes a printing setting portion 1102 and an image data portion 1103. In the printing setting portion 1102, margin information 1104 is described and based on this margin information 1104, the printer 12 performs processing to insert a margin into the received print data. Further, this margin information 1104 is set by acquiring a necessary margin amount (see FIG. 7) for each paper type stored in the device model information database. The printer driver unit 213 converts the print data 1101 including the printing setting portion 1102 in which the margin information 1104 is described into print data in the individual format at S608. Then, at S609, the print data conversion utility 203 transmits the print data in the individual format to the printer 12 via the print communication unit 204. Due to this, it is made possible for the printer 12 to attach a margin at the time of printing by referring to the margin information 1104.

Third Embodiment

As described previously, in the OS standard printing function, it is possible to perform printing based on setting information relating to custom paper (in the following, called custom paper setting information), which is created by a user. Consequently, it is possible for a user to create in advance the custom paper setting information on the drawing application 201. However, despite that the custom paper setting information on the printable area different from the regular size is created, there is a case where the OS standard printing function recognizes the printable area as the printable area of the normal regular size on a condition that the outer shape size is the same. The present embodiment deals with the case such as that. In the following, explanation of the contents common to those of the first embodiment is omitted appropriately and different points are explained mainly.

<Creation of Custom Paper Setting Information>

Figure 12:
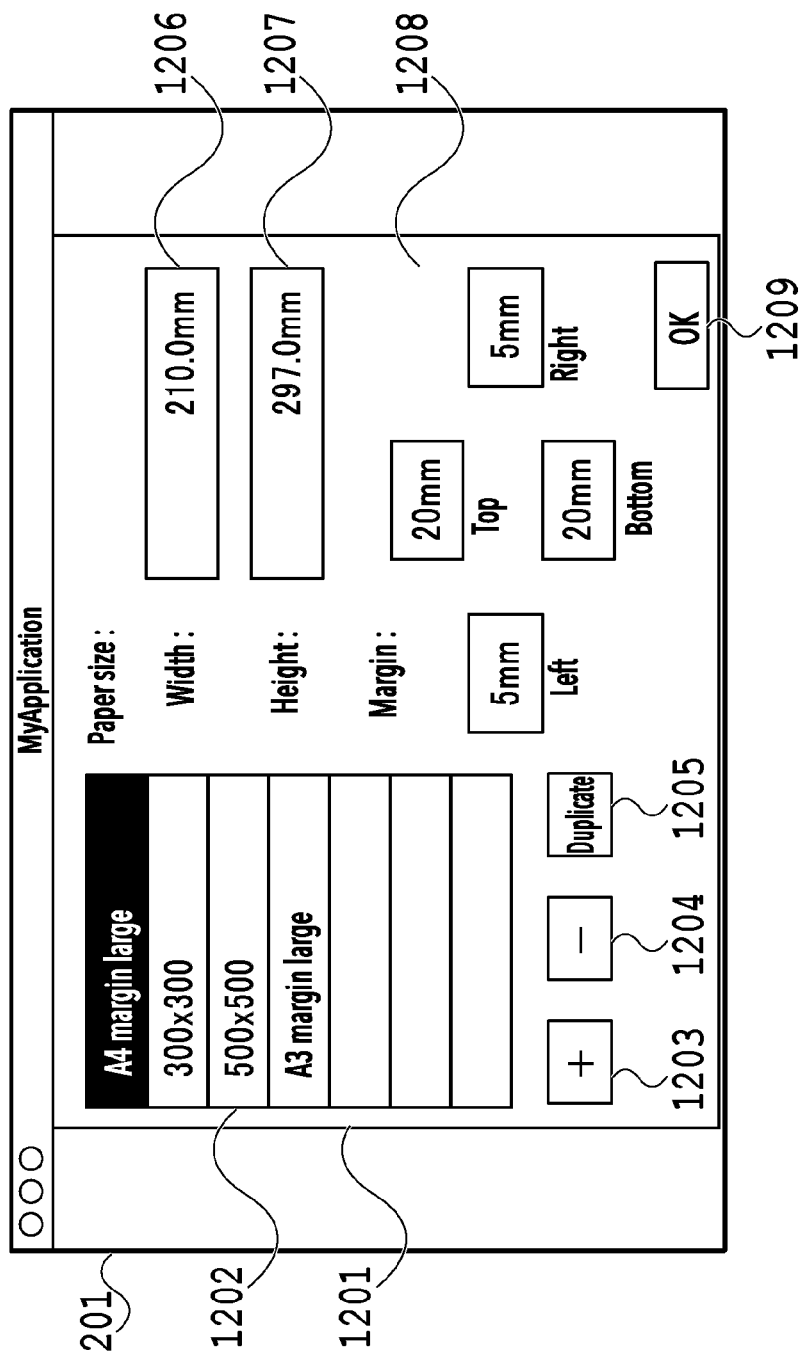
FIG. 12 is a GUI screen that is presented to a user at the time of creating custom paper setting information.

In the following, a custom paper setting information creation function as the OS standard printing function is explained by using FIG. 12. FIG. 12 shows a menu screen for creating custom paper setting information in the present embodiment. It is possible to open a dialog 1201 on the screen of the drawing application 201. On the dialog 1201, a custom paper list 1202, a custom paper addition button 1203, a custom paper deletion button 1204, and a setting information duplicate button 1205 exist. The custom paper list 1202 is a list in which the custom paper for which the custom paper setting information has been created so far is displayed in a list. The custom paper addition button 1203 is a button for creating new custom paper setting information. The custom paper deletion button 1204 is a button for deleting already-created custom paper setting information. The setting information duplicate button 1205 is a button for duplicating already-created custom paper setting information and creating new custom paper setting information.

Further, on the dialog 1201, as custom paper setting menus, a custom paper width menu 1206, a custom paper height menu 1207, and a custom paper margin menu 1208 exist. The custom paper width menu 1206 is a menu for inputting a width of paper. The custom paper height menu 1207 is a menu for inputting a height of paper. The custom paper margin menu 1208 is a menu for inputting a margin of custom paper. In a case where custom paper setting information is created newly, default values are input in these custom paper setting menus. A user creates custom paper setting information by inputting an arbitrary width, height, and margin and performing the setting of desired custom paper. Further, by selecting the custom paper for which the custom paper setting information has already been created in the custom paper list 1202, it is possible for the user to check the width, height, and margin of the selected custom paper on the screen. In a case where the creation of the custom paper setting information is completed, a user presses down an OK button 1209 to close the dialog 1201.

FIG. 12 shows the state where the custom paper setting information on the paper the same size as the A4 size (210 mm×297 mm) and only the margin of which is different from the regular size (in the following, called "custom A4 margin-large size") is created and the custom A4 margin-large size is selected. In this case, it is assumed that each of the top, bottom, left, and right margins for the A4 regular size is 5 mm, and for the custom A4 margin-large size, each of the top and bottom margins is 20 mm and each of the left and right margins is 5 mm.

<Printing Processing in a Case where Custom Paper is Selected>

In a case where custom paper setting information is created by a user, it is possible to select custom paper in the paper size menu 46 (see FIG. 4) and perform printing for the selected custom paper. Here, a case is considered where the A4 margin-large size described previously is selected in the paper size menu 46 and printing is performed. In this case, the drawing application 201 outputs print data in the standard format and printing setting information on the custom A4 margin-large size based on the printing setting in the paper size menu 46. The expected operation is that the print data in the standard format and the printing setting information are delivered to the print data conversion utility 203 via the OS standard printing system 202.

However, it may happen sometimes that the OS standard printing system 202 delivers the print data in the standard format and the printing setting information that are the same as those in a case where the A4 regular size is selected in the paper size menu 46 to the print data conversion utility 203. In this case, it is not possible for the print data conversion utility 203 to determine whether the A4 regular size is selected or the custom A4 margin-large size is selected in the paper size menu 46.

<Reference to Custom Paper Setting Information>

Figure 13:
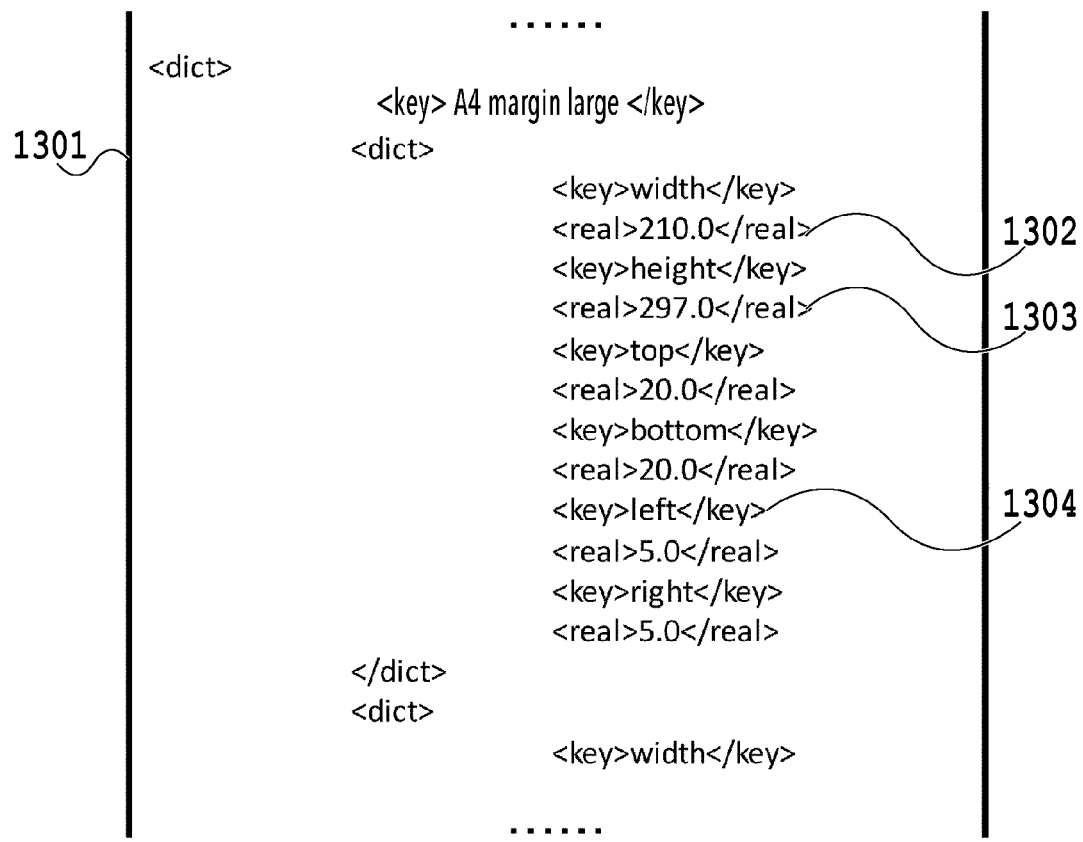
FIG. 13 is a schematic diagram showing a custom paper setting file.

Consequently, in the present embodiment, the OS standard printing system 202 refers to the custom paper setting information stored within the system and the print data conversion utility 203 performs processing based on the custom paper setting information. FIG. 13 shows a custom paper setting information file 1301 stored by the OS standard printing system 202. As shown in FIG. 13, for the custom paper setting information created via the dialog 1201, width information 1302, height information 1303, and margin information 1304 are stored in the custom paper setting information file 1301. This custom paper information is described in the markup language.

The information in the custom paper setting information file 1301 is used in a case where the custom paper size and margin information are displayed in the paper size menu 46 and the dialog 1201. Further, the information in the custom paper setting information file 1301 is also used in a case where the OS standard printing system 202 delivers the print data in the standard format and the printing setting information to the print data conversion utility 203.

In the present embodiment, it is not possible to distinguish whether the A4 regular size is selected or the A4 custom margin-large size is selected in the paper size menu 46 for the print data in the standard format and the printing setting information that are delivered to the print data conversion utility 203. In other words, whichever size is selected, the printing setting information on the A4 regular size shown in FIG. 5 is delivered to the print data conversion utility 203. In a case where the print data and the printing setting information on the regular size are delivered to the print data conversion utility 203, whether the paper type is selected in the paper type menu 36 is determined, for which desired printing results are not obtained unless the margin-large size whose margin is larger than that of the normal regular size is selected. As in the first embodiment, this determination is performed by the print data conversion utility 203 acquiring necessary information from the data table stored in the device model information database shown in FIG. 7. Next, the print data conversion utility 203 checks whether the information on the custom paper the same shape as that of the regular size exists by referring to the custom paper setting information file 1301. In a case where the information on the custom paper the same shape as that of the regular size exists within the custom paper setting information file 1301, the possibility that the custom A4 margin-large size has been selected in the paper size menu 46 is strong. Because of this, the print data conversion utility 203 instructs the data conversion unit 212 and the printer driver unit 213 to perform processing based on the information on the custom paper the same shape as that of the regular size described in the custom paper setting information file 1301.

Figure 14:
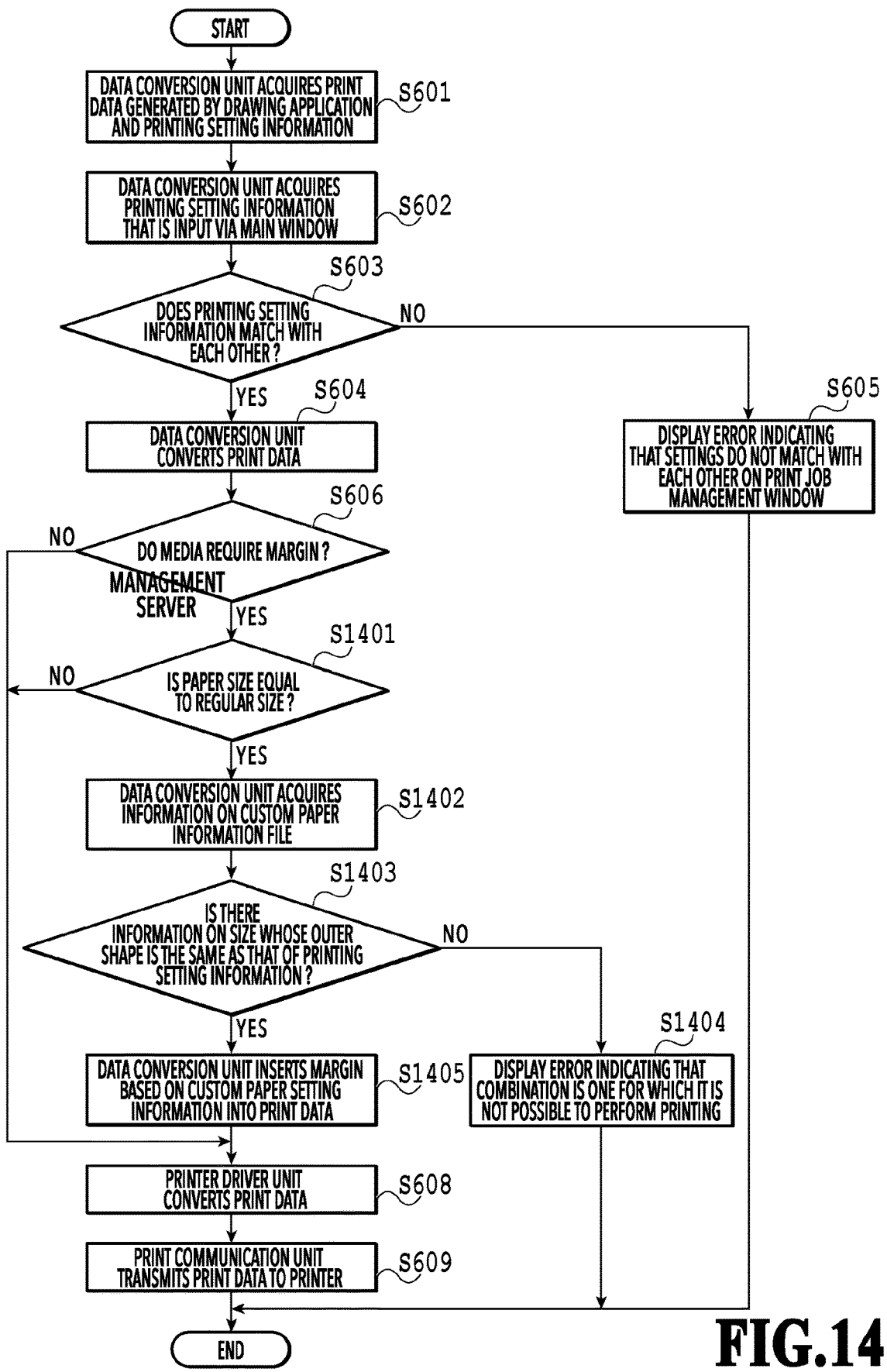
FIG. 14 is a flowchart showing a flow of each piece of processing performed by a print data conversion utility in a third embodiment.

FIG. 14 shows the flowchart showing the processing of the print data conversion utility 203 in the present embodiment. The flow at S601 to S606 in FIG. 14 is the same as that of the first embodiment, and therefore, explanation of each piece of the processing is omitted (see FIG. 6).

In a case where the determination results at S606 are affirmative, that is, in a case where the data of the margin-large size is necessary, at S1401, the data conversion unit 212 determines whether the paper size information of the current printing setting information indicates the regular size. In a case where the determination results at this step are affirmatively, the processing advances to S1402 and on the other hand, in a case where the determination results are negative, the processing advances to S608.

First, a case where the determination results at S1401 are negative (that is, in a case of NO at S1401), that is, a case where the printing setting for the custom paper has been performed is explained. In this case, by performing printing in accordance with the printing setting for the custom paper faithfully, it is possible to perform printing in accordance with the input via the paper size menu 46. Consequently, the processing advances to S608 without performing particular processing and the print communication unit 204 transmits the print data to the printer 12 at S609.

Following the above, a case where the determination results at S1401 are affirmative (that is, in a case of YES at S1401), that is, a case where the printing setting for the regular size paper has been performed is explained. In this case, there is a possibility that the OS standard printing system 202 has set the paper size information as information indicating the regular size despite the selection of the custom paper by a user in the paper size menu 46. Consequently, at S1402, the data conversion unit 212 acquires the information stored in the custom paper setting information file 1301 by referring to the custom paper setting information file 1301.

At S1403, the data conversion unit 212 determines whether there is information on the custom paper within the custom paper setting information file 1301, whose outer shape size is the same as the size indicated by the paper size information of the printing setting information based on the information acquired at S1402 and the current printing setting information.

That the determination results at S1403 are negative means that the regular size is selected simply in the paper size menu 46. It is not possible to perform printing with a combination of the selected regular size and the paper type for which desired printing results are not obtained unless the margin-large size whose margin is larger than that of the normal regular size is selected. Consequently, in this case, at S1404, the print data conversion utility 203 displays a setting error on the print job management window 37 and the series of processing is completed.

On the other hand, in a case where the determination results at S1403 are affirmative (in a case of YES at S1403), it is possible to determine that the OS standard printing system 202 has set the information on the paper size as information corresponding to the regular size despite the selection of the custom paper whose shape and size are the same as those of the regular size in the paper size menu 46. Consequently, at S1405, the data conversion unit 212 performs processing to insert a margin into the print data based on the custom paper setting information acquired from the custom paper setting information file 1301.

After that, the processing advances to S608 and S609 and the print data is transmitted to the printer and the series of processing is completed.

<Processing that Takes into Consideration a Plurality of Pieces of Custom Paper of Same Shape>

In a case where the plurality of pieces of custom paper setting information stored in the custom paper setting information file 1301 and the printing setting information match with each other at S1403, it may also be possible to cause a user to select which custom paper setting information to use for printing on the print job management window 37. The reason is that in a case where there exists a plurality of pieces of custom paper having the same outer shape but different margins, it is not possible to uniquely determine custom paper setting information to be used. By causing a user to select which custom paper to use, it is made possible to provide desired printing results.

Figure 15:
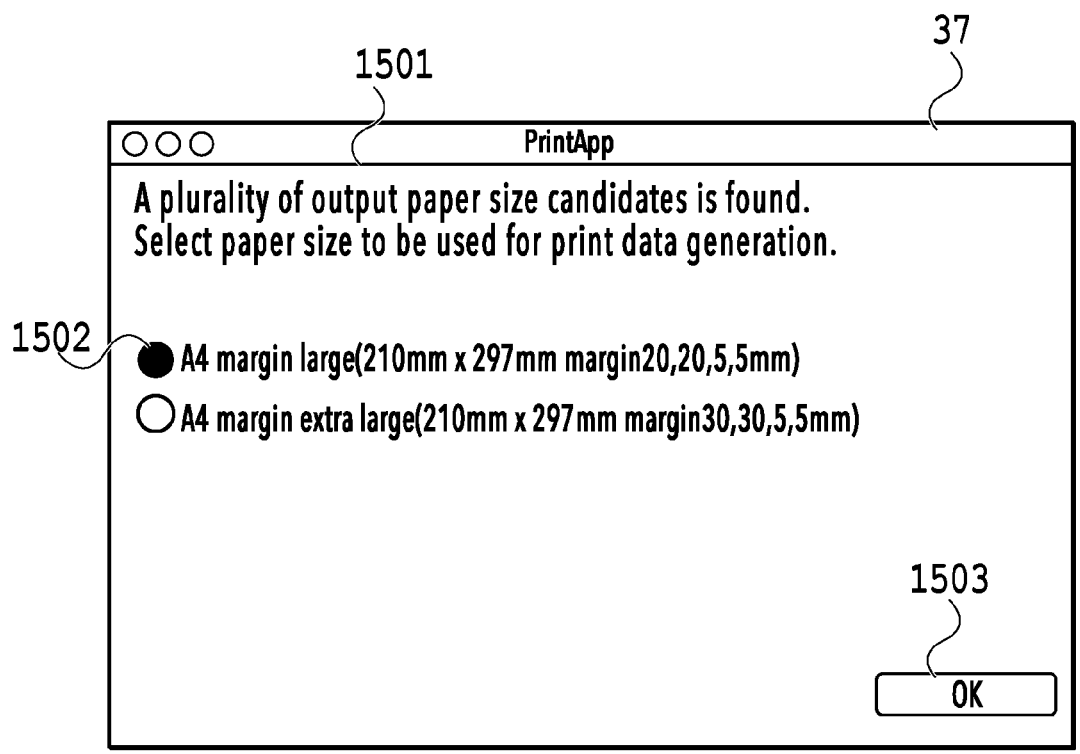
FIG. 15 is a schematic diagram showing a custom paper selection dialog in the print data conversion utility.

FIG. 15 shows an example of the custom paper selection dialog. In a custom paper selection dialog 1501 on the print job management window 37, a selection candidate custom paper list 1502 exists. By a user selecting custom paper the user desires to use for printing from the list and then pressing down an OK button 1503, printing processing using the selected custom paper information is started.

<Processing that Takes into Consideration Margin Amount of Custom Paper>

Further, even though the custom paper setting information stored in the custom paper setting information file 1301 and the printing setting information match with each other at S1403, there is a case where custom paper setting information whose margin amount is short is created. Specifically, there is a case where it is found that the margin amount of the custom paper is less than the necessary margin amount as a result of acquiring the necessary margin amount for the selected paper type from the data table (see FIG. 7) stored in the device model information database and comparing the margin amount of the custom paper and the necessary margin amount. In this case, desired printing results are not obtained eventually, and therefore, it may also be possible to perform processing to exclude the custom paper from the candidates of the custom paper to be used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, it is made possible to provide a printing system capable of supporting a plurality of printable areas for one paper size without using an inherent printer driver.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-078324, filed Apr. 27, 2020, which is hereby incorporated by reference wherein in its entirety.

What is claimed is:

1. A control method executed by at least one processor of an information processing apparatus in which first printing control software and second printing control software different from the first printing control software are installed, the control method comprising:
by the second printing control software, receiving first format print data created by the first printing control software; and
by the second printing control software, based on the received first format print data, creating second format print data which is different from the first format print data,
wherein in a case where a paper type of the first format print data is a first paper type, a first margin amount is set by the second printing control software, and in a case where the paper type of the first format print data is a second paper type which is different from the first paper type, a second margin amount which is different from the first margin amount is set by the second printing control software.

2. The control method according to claim 1, further comprising:
by the second printing control software, converting the first format print data for which the first margin amount or the second margin amount is set into the second format print data.

3. The control method according to claim 1, wherein the first format print data is a raster format print data.

4. The control method according to claim 1, further comprising:
by the second printing control software, determining whether a paper type based on printing setting set in a drawing application and a paper type which the second printing control software receives based on user instructions match with each other,
wherein in a case where it is determined that the paper types match with each other, the first margin amount or the second margin amount is set for the second format print data.

5. The control method according to claim 1, wherein the first margin amount or the second margin amount is set for the second format print data based on a method indicated by a user of a first method of deleting by a margin to be set a portion of data to be printed and a second method of reducing the data to be printed so as not to delete the portion of the data to be printed by the margin to be set.

6. The control method according to claim 5, further comprising:
by the second printing control software, displaying on a display device a screen for causing the user to select either the first method or the second method.

7. The control method according to claim 1, further comprising:
by the second printing control software, displaying on a display device a preview of printing results based on the second format print data for which either the first margin amount or the second margin amount is set.

8. The control method according to claim 1, further comprising:
by the second printing control software, displaying on a display device a message warning there is a possibility that printing results based on the second format print data for which either the first margin amount or the second margin amount is set are different from printing results based on print data before the margin amount is set.

9. The control method according to claim 1, wherein in a case where a margin amount of print data created by a drawing application is larger than or equal to a predetermined value, a margin is not set for the second format print data by the second printing control software.

10. The control method according to claim 1, wherein the first printing control software is software provided by an operating system installed in the information processing apparatus.

11. The control method according to claim 1, wherein the second printing control software is software provided by a vendor of a printing apparatus which is connected to the information processing apparatus and performs printing based on the second format print data.

12. The control method according to claim 1, wherein the second format print data is transmitted to a printing apparatus which cannot interpret the first format print data.

13. The control method according to claim 1, further comprising:
by the second printing control software, based on the received first format print data, creating second format print data which is different from the first format print data and has either the first margin amount or the second margin amount inserted based on the paper type to be printed.

14. An information processing apparatus in which first printing control software and second printing control software different from the first printing control software are installed, the information processing apparatus comprising:
at least one processor; and
at least one memory configured to store conversion software that, when executed by the at least one processor, causes the information processing apparatus to act as:
a receiving unit configured to receive first format print data created by the first printing control software; and
a creating unit configured to create, based on the received first format print data, second format print data which is different from the first format print data,
wherein in a case where a paper type of the first format print data is a first paper type, a first margin amount is set by the creating unit, and in a case where the paper type of the first format print data is a second paper type which is different from the first paper type, a second margin amount which is different from the first margin amount is set by the creating unit.

15. The information processing apparatus according to claim 14, wherein the creating unit converts the first format print data for which either the first margin amount or the second margin amount is set into the second format print data.

16. The information processing apparatus according to claim 14, wherein the first format print data is a raster format print data.

17. The information processing apparatus according to claim 14, further comprising:
a determination unit configured to determine, by the second printing control software, whether a paper type based on printing setting set in a drawing application and a paper type which the second printing control software receives based on user instructions match with each other,
wherein in a case where it is determined that the paper types match with each other, the creating unit sets either the first margin amount or the second margin amount for the second format print data.

18. The information processing apparatus according to claim 14, wherein the creating unit sets either the first margin amount or the second margin amount for the second format print data based on a method indicated by a user of a first method of deleting by a margin to be set a portion of data to be printed and a second method of reducing the data to be printed so as not to delete the portion of the data to be printed by the margin to be set.

19. The information processing apparatus according to claim 14, wherein the first printing control software is software provided by an operating system installed in the information processing apparatus.

20. The information processing apparatus according to claim 14, wherein the second printing control software is software provided by a vendor of a printing apparatus which is connected to the information processing apparatus and performs printing based on the second format print data.

21. The information processing apparatus according to claim 14, wherein the second format print data is transmitted to a printing apparatus which cannot interpret the first format print data.

22. The information processing apparatus according to claim 14, wherein the creating unit creates, based on the received first format print data, second format print data which is different from the first format print data and has either the first margin amount or the second margin amount inserted based on the paper type to be printed.

23. A non-volatile storage medium storing a program for causing a computer in which first printing control software and second printing control software different from the first printing control software are installed to execute:
by the second printing control software, receiving first format print data created by the first printing control software; and
by the second printing control software, based on the received first format print data, creating second format print data which is different from the first format print data,
wherein in a case where a paper type of the first format print data is a first paper type, a first margin amount is set by the second printing control software, and in a case where the paper type of the first format print data is a second paper type which is different from the first paper type, a second margin amount which is different from the first margin amount is set by the second printing control software.

24. The storage medium according to claim 23, wherein the second printing control software converts the first format print data for which either the first margin amount or the second margin amount is set into the second format print data.

25. The storage medium according to claim 23, wherein the second printing control software, based on the received first format print data, creates the second format print data which is different from the first format print data and has either the first margin amount or the second margin amount inserted based on the paper type to be printed.

* * * * *